Patented Jan. 21, 1947

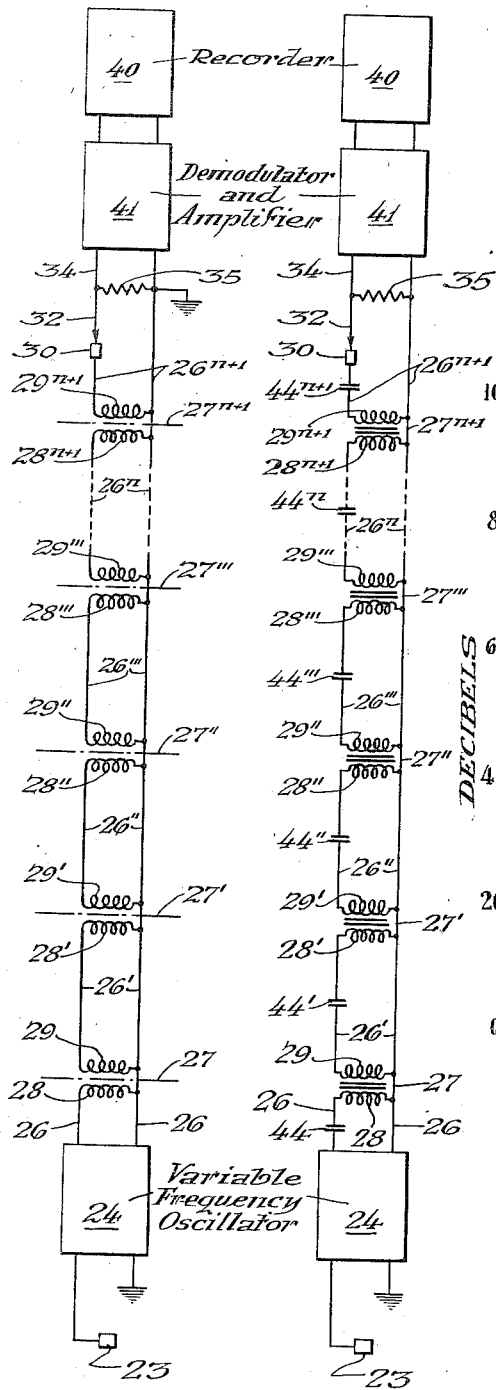
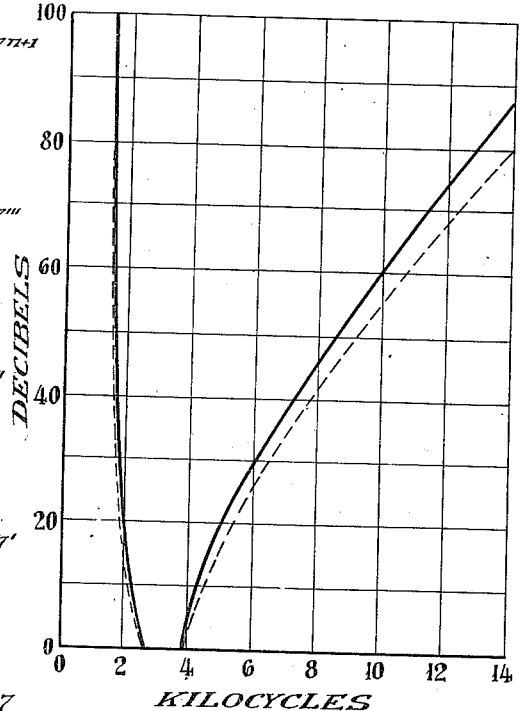
Fig. 2.  Fig. 5.  Fig. 6.

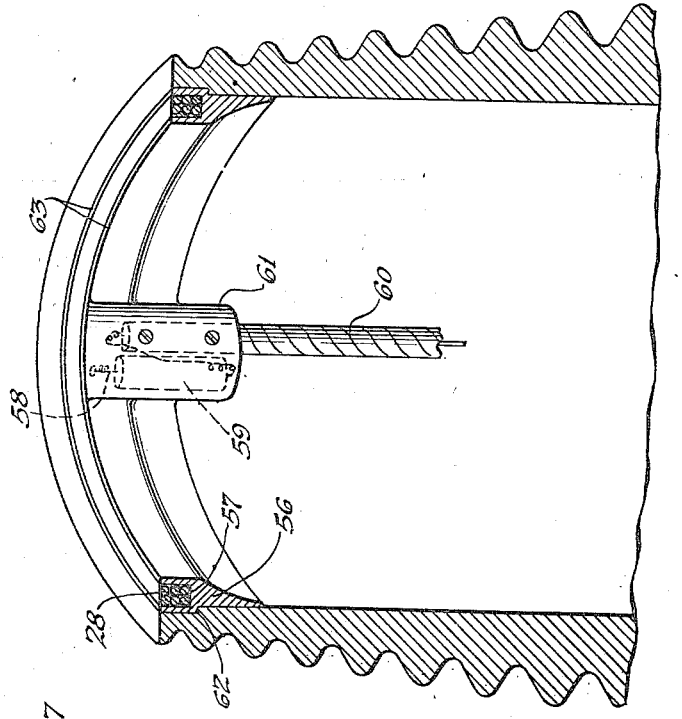
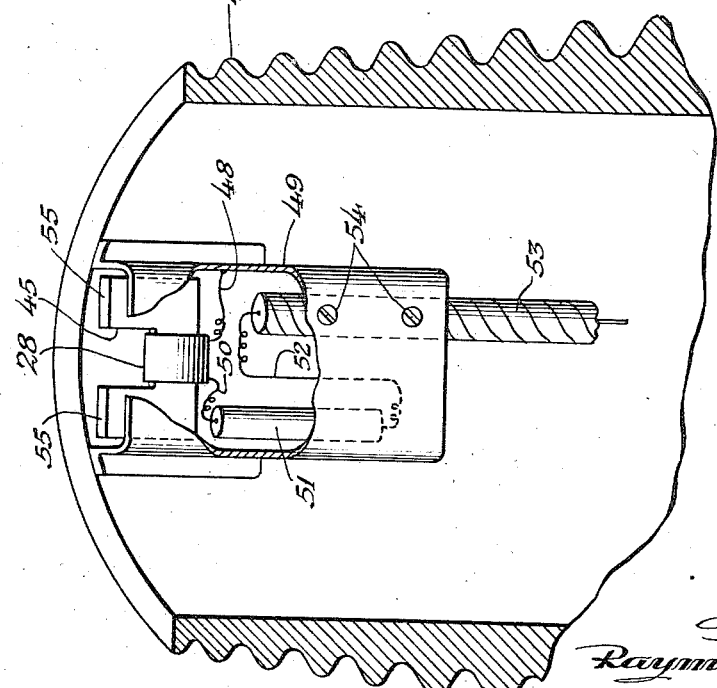

2,414,719

UNITED STATES PATENT OFFICE 2,414,719

TRANSMISSION SYSTEM

Raymond T. Cloud, Tulsa, Okla., assignor to Stanolind Oil and Gas Company, Tulsa, Okla., a corporation of Delaware Application April 25, 1942, Serial No. 440,510

4 Claims. (Cl. 178—44)

This invention pertains to the art of transmission of electrical signals through conduits and has particular application in the simultaneous transmission of electric energy through a jointed metal conduit adapted to transmit material substances such as water, oil, etc. One advantageous utilization of this system lies in the electrical logging of wells.

There are numerous fields in which it would be advantageous to arrange for the simultaneous transmission through a jointed conduit of both material substances and electric energy. Thus, for example, in the field of oil pipe lines it is advantageous to be able to transmit electric signals, for example telephone messages, between various points in the pipe line so that operators can utilize the pipe line system as a medium of transmission of messages regarding the amount of oil passing through the line, etc. This is particularly true where the pipe line passes through bodies of water where erection of telephone lines is impractical. Again in the determination of one or more characteristics of the strata traversed by a well, it is advantageous to be able to determine these characteristics as the drilling progresses and at a point adjacent the drill bit so that at the time of measurement there is a minimum amount of contaminations of the formations by drilling fluid, etc. In the electrical determination of such properties it is, therefore, advantageous to be able to utilize an electric transmission system within the drill pipe itself for the conduction of these signals. However, the difficulties involved in running a continuous, electric transmission line through a jointed metal conduit of any length, particularly in cases in which sections of the conduit must be removed during operations (such as in the drilling of wells) are great.

I have devised a system by means of which one section of transmission line is placed within each conduit section so that as the sections are joined together, automatically the sections of transmission line are coupled together in such a manner that a completely operable transmission line of length defined by the number of sections joined together is formed. Furthermore, I have found means by the use of which it is possible to avoid direct electric contact between the ends of adjacent sections of the line. This latter fact is of definite importance since it eliminates the need for the insulation of such a contact against the fluid flowing through the pipe line, and also removes the possibilities of accidental grounds in the system in the case of imperfect insulation at any joint, which could only be repaired by uncoupling the particular joint involved.

By the use of the system described below, it is possible to transmit signals of a desired frequency range without substantial attenuation and without interference due to extraneous signals induced in the line from external sources. Accordingly it is possible to transmit intelligence with practically no cross talk or other undesired electric effects. In the preferred system of my invention such signals are eliminated by the attenuation of signal frequencies lying outside the desired transmission band.

It is an object of this invention to provide a conduit section for cooperating with similar sections to form a conduit for the simultaneous transmission of both material substances and electric energy. The side walls of the conduit are impervious so that no material substance can escape therethrough, but must be transmitted solely through the joint of the conduit. Another object of my invention is to provide a system for the simultaneous transmission of material substances and electric energy in which the transmission of the electric energy is unaffected by the material substances flowing through the conduit. Another object of this invention is to provide such a system in which the connection between sections of the conduit automatically connects the sections of the transmission line in each conduit section. A further object of this invention is to provide a system of the type described in which at all times the electric system is insulated from the material flowing in the pipe line and in which the coupling between adjacent sections of the transmission line is accomplished without the function of metal contacts at each joint, which contacts must be suitably insulated from the walls of the pipe. Another object of the invention is to provide a system for the simultaneous transmission of both electric conducting liquids and electric signals in which signals lying within a desired predetermined frequency band are transmitted without substantial attenuation while signals lying outside of this band are strongly attenuated. It is a further object of this invention to provide a system for simultaneously drilling a well and determining at least one characteristic of the formations adjacent this well as the drilling is in progress, by means of which electric signals proportional to the characteristic being measured are transmitted within the drill pipe to the surface of the ground in the form of a frequency modulated signal, demodulated at the surface, and recorded, this system being readily adaptable to rapid decoupling of any section of the drill pipe without injury to the electric transmission system or affecting its operation. Further objects and advantages of this invention are shown in this specification.

This invention is capable of wide application, and the physical embodiments of the invention vary in accordance with the particular requirements of the application. It is to be understood that the attached drawings which form a part of this specification and which are illustrations of certain embodiments of this invention are merely for the purpose of illustration and that the invention is not limited to the use of the embodiments shown. In these figures the same reference numeral in different figures refers to the same or corresponding part.

Figure 2 is a wiring diagram of the well logging system shown in Figure 1;

Figure 3 is a wiring diagram of an inductive coupling element of the type shown in Figure 2;

Figure 4 is a wiring diagram of a modified form of inductive coupling element;

Figure 5 is a wiring diagram of a transmission system in accordance with my invention utilizing the modified form of coupling element shown in Figure 4;

Figure 6 is a graph of the attenuation of signals of varying frequency passing through a transmission line constructed in accordance with my invention;

Figure 7 is a view of an inductive coupling element in accordance with my invention;

Figure 8 is a cross section of the end of a section of drill pipe showing the installation of electric apparatus used in carrying out one embodiment of my invention; and Figure 9 is a similar view of cross section of the end of a section of drill pipe showing another form of coupling element.

Figure 1:
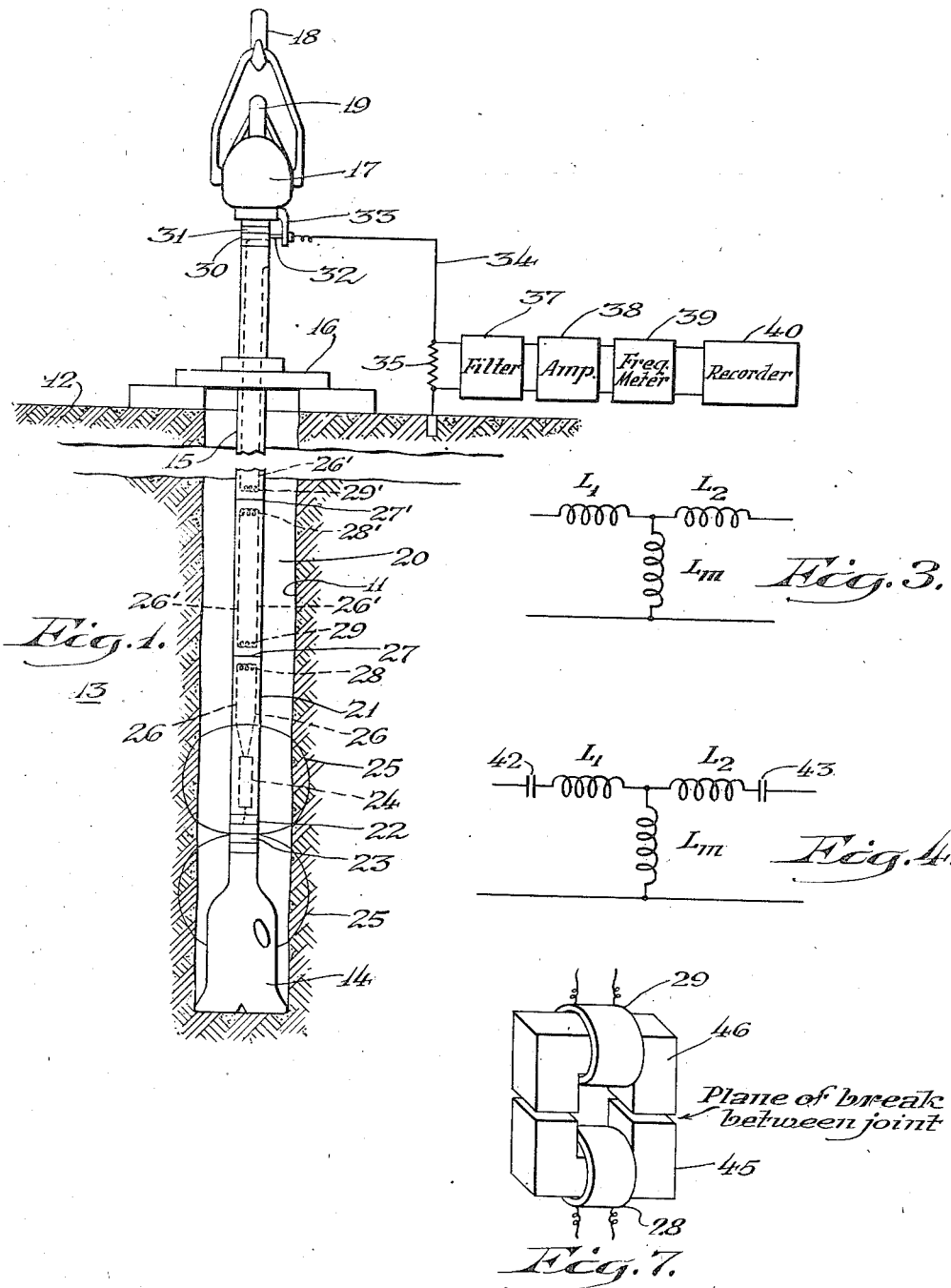
Figure 1 represents in diagrammatic form a cross section of earth formations penetrated by a drilling well and one form of apparatus useful in carrying out my invention.

Generally speaking, the transmission system which I employ comprises in addition to the jointed conduit an electric reactance at one end of each conduit section, a second reactance at the other end of each section and electric connections between each first and second reactances, the reactances being so arranged that when two conduit sections are joined together there is a mutual reactance between the two electric reactances adjacent the common joint, whereby an electric signal passing through one reactance generates a corresponding electric signal in the associated reactance on the other side of the common joint. Since the transmission between the reactances is by electromagnetic coupling and not by direct conduction, it is apparent that each of the reactances can be insulated so that it is impossible to short circuit it by any fluid passing through the conduit regardless of whether the conduit sections are in contact or not, thus eliminating what is probably the major difficulty in the operation of such a system. In the preferred form of my invention each section of the transmission line within the conduit section is electrically tuned to pass signals, the frequencies lying within a predetermined band and attenuated signals lying outside of this band so that there is practically no possibility of either electromagnetic or electrostatic coupling of the transmission line with extraneous currents flowing outside the conduit or along the conduit itself.

The application of such a transmission system to an electrical logging-while-drilling system is shown in Figure 1. In this figure a well 11 has been drilled from the surface of the ground 12 into various earth formations such as formation 13. This has been accomplished by the use of a drill bit 14 at the lower end of a drilling string 15 which is rotated by rotary table 16. The drilling string is composed in the conventional fashion of pipe sections screwed together by use of the conventional box and pin type screw joints. At the top, the drilling string is supported by a drilling swivel 17 which in turn is supported by the hook 18 of a travelling block supported in a derrick (not shown). In the drilling of wells by the rotary system such as the system shown, drilling fluid is constantly being circulated through the well and out again, normally being passed to the system through a flexible hose (not shown) attached to the "goose neck" 19 of the drilling swivel from which point it passes through the drilling string 15 out around the bit 14 and back to the surface of the ground through the annular space 20. In order to log the formations as soon as they are drilled and before substantial drilling fluid contamination by determining one characteristic of such formations, for example the resistance or impedance of the formations to electric currents, a section of the drilling collar 21 immediately above the bit 14 is insulated by insulation 22. A metal band 23 is mounted on this insulation. Electric apparatus 24 mounted in a cavity in the walls of the drilling collar applies a difference of potential between the metal band 23 and the drilling string 15 so that current flows therebetween. This current will flow through the drilling fluid and through the formations along paths such as paths 25 shown. It is apparent that the resistance between the metal band 23 and the drilling string will be effected by the resistance or impedance of the adjacent formations and that a measurement of this resistance is indicative of the resistance or impedance of the formations immediately above those being drilled. The apparatus 24 is adapted to generate a pulsating signal which is either modulated in amplitude or in frequency in proportion to the electric characteristic being measured. The output of this equipment is impressed across conductors 26 mounted in the inside of the drill string and suitably insulated against short circuiting due to the passage of the highly conductive drilling fluid. At each joint 27 in the drill string there is a first electrical reactance 28 on one side of the joint immediately adjacent a second electrical reactance 29 on the other side of the joint so that there is a mutual reactance between the two. The signal impressed across conductors 26 is therefore coupled through the mutual reactance between each first reactance 28 and second reactance 29 so that the signal is transmitted up the sections of the drill pipe 15 to the top section rotated by the rotary table 16. Any desired method may be used to pick up the signal at this point and transmit it to the recording apparatus. For example, in Figure 1 I have shown one of the conductors 26 in this top section as grounded to the kelly while the other conductor 26 is in electric contact with a slip ring 30 suitably insulated from the kelly by a band of insulation 31. A brush 32 in contact with ring 30 is mounted on a brush holder 33 held in place on the drilling swivel 17. A conductor 34 is connected to the brush 32 and to one end of the resistance 35, the other side of which is grounded. The incoming signal across conductors 26 therefore appears across the resistance 35.

The apparatus shown at the surface of the ground for recording the signals is of the type which is employed when the electric apparatus 24 in the well produces a signal the frequency of which varies with the electric characteristic being measured. This may include a filter 37, which is seldom needed for reasons which will be set forth below, an amplifier 38 and an electronic frequency meter 39 which is adapted to put out a signal the amplitude of which varies with the frequency of the incoming signal across resistance 35, and recorder 40 which is adapted to record as a function of time the amplitude of the signal put out by the frequency meter 39. Various forms of equipment suitable for use at the surface of the ground have been previously described and since this apparatus is known to the art, no further description is given herein.

In Figure 2 the electrical elements forming the basic transmission system shown in Figure 1 are disclosed in greater detail. The apparatus 24 at the base of the well is shown as a variable frequency oscillator, the frequency of which depends upon the resistance between the drilling string shown at ground potential and the metal band or electrode 23 insulated from the drilling string. The output from the variable frequency oscillator is applied across conductors 26, as previously described, and thereby appears across the first reactance 28, in this case shown as a primary coil. The location of the joint 27 is shown diagrammatically by the dotted line. Adjacent this first reactance 28 is the second reactance 29 shown in this figure as a secondary coil. Due to the electromagnetic coupling between these two coils which is due to the mutual impedance between them, the signal impressed across coil 28 appears across coil 29. It is thereby transmitted by the next set of conductors 26' to the next primary coil 28' where the same action takes place, and so on. A dotted section is shown in this transmission line representing the omission of a number of similar sections to those already described. The signal which has been transmitted to the last coil 29$^{n+1}$ appears between ground and the slip ring 30, from which it is picked up by brush 32 and transmitted through line 34 to the recording apparatus. In this figure the filter, amplifier and frequency meter are shown combined into one diagrammatic unit consisting of a demodulator and amplifier 41, the output of which is connected to the recorder 40. The action of the demodulated amplifier can be exactly the same as that described in connection with the filter 37, amplifier 38 and frequency meter 39.

In Figure 2 one side of the transmission line is shown as common to all sections of the line. This is a quite convenient though not necessary arrangement since by utilizing such a system it is possible to connect one side of each mutual reactance to the section of the drill string 15 in which it is placed; thus eliminating the need for one of the insulated conductors 26 so that only one insulated conductor per section of drill pipe is used.

Of course, if instead of the pipe, conduit sections are used which are insulators, it is necessary to use two electric conductors 26 as shown in Figure 1.

The electric energy transmitted across each joint 27 is transmitted due to the magnetic flux linking the reactance 28 with the corresponding reactance 29. There is no transmission of the electric energy by direct conduction. It is possible to insulate each reactance 28 and 29 not only against other than the desired single contact with the metal walls of the conduit but against accidental contact with each other across the joint. Therefore, the reactance at each joint can be mounted upon or moulded in insulation such as Bakelite at the time of manufacture whereby there is practically no possibility during operations of a short circuit across the reactance. If direct conductance were used to transmit the signal across each joint it would be necessary to provide means for insulating the point of electrical contact after the contact had been made which would involve flexible insulation, extreme care in making up the joint and definite posibility that the point of contact between adjacent insulation elements at this joint would fail when the system was subject to high fluid pressure.

The primary coil 28 and the secondary coil 29 at each joint 27 can be represented by an electrical equivalent circuit shown in Figure 3 in which $L_1$ represents the leakage reactance of the coil 28, $L_2$ represents the leakage reactance of coil 29 and $L_m$ represents the mutual reactance between the coils due to their proximity. This mutual reactance can be increased by the use of ferromagnetic core members associated with each reactance which when the joint is put together form an improved magnetic linkage between the two coils. As long as the signal put out by the electric equipment at the bottom of the well is at relatively low frequency, say of the order of power frequency, the simple transmission line circuit shown in Figure 2 can be utilized nicely. However, when a frequency modulated system is used, it is highly desirable to vary the frequency over considerable range, for example 200 to 10,000 cycles. It can be readily seen that the leakage reactances $L_1$ and $L_2$ in series with the line present considerable impedance to high frequency currents which is undesirable for this application. Accordingly it is desirable to place an electric condenser in series with the coils in order to decrease this high impedance. One such arrangement for accomplishing this result is shown in Figure 4 in which a condenser 42 is shown in series with the primary coil and a condenser 43 is connected in series with the secondary coil. These condensers reduce the series reactance in the line to a very marked degree and can be chosen to give either of two advantageous results. If, for example, it is desired to operate using frequency modulation on the signals, these condensers 42 and 43 are chosen of such size that they form in connection with the coils a band pass filter passing frequencies between a lower cut-off frequency $f_1$ and a higher cut-off frequency $f_2$ which frequencies are chosen to cover the desired range of output of the variable frequency oscillator 24. If, on the other hand, signals are produced at a constant frequency but at modulated amplitude, condensers 42 and 43 in each section of the line are chosen of such a value that the line is substantially in resonance at the desired frequency so that again the signals are transmitted to the surface of the ground with a minimum of attenuation.

Although the series resonant circuit has advantages under some circumstances, I prefer to operate the transmission line in connection with a frequency modulated oscillator and choose the values of condensers 42 and 43 so that each section of the line operates as a band pass filter. Preferably the impedance of such a line is chosen to be low so that extraneous signals are in effect short-circuited. This can be accomplished by choosing the impedance of the line to be 1000 ohms or less, for example 50 to 200 ohms. Preferably but not necessarily, the inductance $L_2$ is made equal to $L_1$. In this case the inductance $L_1$, mutual inductance $L_m$ and capacity $C_1$ of each condenser 42 and 43 to pass frequencies between the lower cut-off frequency $f_1$ and higher cut-off frequency $f_2$ in a transmission line of resistance $R$ are given respectively by the following formulae:

$$L_1 = \frac{f_1 R}{2\pi f_2 (f_2 - f_1)} \quad (1)$$

$$L_m = \frac{(f_1 + f_2) R}{4\pi f_1 f_2} \quad (2)$$

$$C_1 = \frac{f_2 - f_1}{2\pi f_1 f_2 R} \quad (3)$$

The inductance of the coil 28 is equal to $L_1 + L_m$ and is therefore given by $$L = \frac{(f_1^2 + f_2^2) R}{4\pi f_1 f_2 (f_2 - f_1)} \quad (4)$$

Since the line resistance between the condensers at each end of each section of the transmission line is negligible, the two condensers in series at each end of the line can be joined into one, the capacity of which is one half that of each one of the individual condensers. Therefore, if only one condenser is inserted in the connection 26 between the primary and secondary coils at opposite ends of the same conduit section, the capacity $C$ of the condenser is given by $$C = \frac{f_2 - f_1}{4\pi f_1 f_2 R} \quad (5)$$

For example, if a line of 50 ohms impedance is to be designed to pass a band of frequencies from 10,000 to 20,000 cycles, the values of $L_1$, $L_m$ and $C$ are given by $L_1 = 0.0004$ henry
$L_m = 0.0006$ henry
$C = 0.08$ mfd.

The inductance of the primary coil being the sum of $L_1 + L_m$ is therefore 0.001 henry and the coefficient of coupling is 60%. The transmission line which results is shown in Figure 5, with a single condenser 44 in each section of the line in series with a primary coil 28 and a secondary coil 29. The line is terminated in the resistance 35 equal to the resistance $R$ which in this case is 50 ohms.

In Figure 6 I have shown the attenuation in decibels of a transmission line designed in accordance with the principles outlined above to pass signals of frequencies between 2300 and 4000 cycles, with a terminating resistance of 100 ohms. The attenuation shown is for only ten sections of line and increases linearly with the number of sections of line connected together. This graph is based on experimental determination of the attenuation of such a section. It is seen that the attenuation for signals below 2300 cycles and above 4000 cycles is quite high. Thus, for example, at a frequency of 1400 cycles there is an attenuation in excess of 60 db (1000 to 1) whereas for any frequency in the pass band there is an attenuation of considerably less than one decibel. Thus, all effects of earth currents which are substantially all at frequencies under 1000 cycles, are automatically eliminated. In this figure, the solid line is the attenuation measured using ferromagnetic core sections which were separated at the joint by approximately .006 inch. The dotted line is the attenuation measured when the core sections were in actual contact. It is thus apparent that slight separation of the core sections does not affect the attenuation in the desired frequency band but does increase it in the region in which the increase in attenuation is advantageous; namely, in the rejection bands.

The magnetic coupling between the primary and secondary coils can be achieved in a number of different ways. In Figure 7 one such arrangement is shown. Here the primary coil 28 and secondary coil 29 each link a ferromagnetic core section (45 and 46 respectively) which are arranged so that they can abut at the plane of break between joints. In this particular figure these sections are shown as symmetrical sections in which case they are called, for lack of a better name, "half-cores." It is not necessary that half-cores be used. It is sufficient if the core members form a substantially closed magnetic circuit when the joint is made up, that is, screwed together. Coil 28 and its core section 45 are mounted in one joint with the ends of the core, or pole faces, approximately flush with the end of the joint. Coil 29 and its associated core section 31 are similarly mounted in the other joint, so that when the joint is screwed together the ends of the core sections substantially abut so that the reactances of coils 28 and 29 are operatively associated, i. e. inductively coupled. The two core sections when in the abutting position thus form a magnetic coupling the flux through which links coils 28 and 29 to form the mutual inductance therebetween. This magnetic circuit is substantially closed even for a small air gap of the order of .01 inch or so.

One method of mounting the coil and the core section in the end of a drill pipe without the necessity for specially preparing the drill pipe section is shown in Figure 8. Here the end of the screw joint 47 at the end of the drill pipe section is shown in cross section. The coil 28 has been wound around the ferromagnetic core section 45. One terminal 48 of this coil 28 has been attached to the wall of the terminal box 49 which forms a metallic sheath around the entire coupling element, thus protecting it from abrasion due to flow of the drilling fluid. The other terminal 50 of the coil 28 is connected to the condenser 51, the other terminal 52 of which is in turn attached to the insulated conductor of the armored cable 53 which is attached to the terminal box 49 by screws 54 or other fasteners. The space not occupied by the electrical elements inside of the terminal box 49 is filled with Bakelite cement and baked out or molded in Bakelite with the interstices filled with Bakelite cement so that the entire assembly is substantially water-tight and insulated from short circuiting effects due to the water or other fluid flowing through the pipe. At the opposite end of the conduit a similar unit is provided with the exception that a condenser 51 need not be present. The terminal box 39 at each end is fastened to the wall of the drill pipe 47 in a manner which prevents this assembly from sliding along the side walls of the drill pipe when hydraulic pressure is applied to the fluid being carried in the drill pipe. When the next joint of drill pipe is made up the pole faces 55 of the core member 45 closely abut the corresponding pole faces of the corresponding core member forming a good magnetic coupling between the corresponding coils.

Another suitable arrangement of the electric coupling between conduit sections is shown in Figure 9. In this particular case the core member 56 is of U-shape cross section defining a trough 57 in which the coil 28 is placed. One end of the coil 28 is attached to the surface of the annular magnetic member 56 and the other is connected by insulated wire 58 to the series condenser 59 which in turn is connected to the insulated conductor of the cable 60. A small "streamlined" connector box 61 serves to cover the end of the connection from the cable to the coil and protect this from moisture. The windings of coil 28 in the trough 57 are waterproofed before insertion in the ring and may be covered with Bakelite cement or the like for use. Preferably but not necessarily, a slight shoulder is machined in the annular core 62 and a corresponding shoulder is machined in the end of the drill pipe so that the entire annular ring can be pressed into place and held solidly against vibration. The arrangement of the whole apparatus is such that there is little opposition to free passage of fluid past the joint when the joint is made up and core barrels pass the joints easily. The pole faces 62 of the core member fit snugly against the corresponding pole faces of the annular member in the other half of the joint. Any suitable material may be used for the magnetic member such as, for example, Armco iron, nickel alloy, magnetic steel, or the like.

It is apparent from the above description that no particular attention need be given the drill pipe as the joints are being made up since all the electrical apparatus is insulated and out of the way. Accordingly no difficulty should be experienced in making up or breaking up the necessary tool joints. The apparatus as described is suitable for either frequency modulated signals or amplitude modulated signals with a minimum of interference from undesired signals.

Although the description of this invention has been with particular reference to the electrical logging of wells, it is apparent that it finds ready application in any application in any instance in which it is desirable to conduct material through a jointed conduit at the same time that it is desired to use the same conduit for the transmission of electrical signals.

I claim:

1. A conduit section designed to cooperate with similar sections to form both a conduit for fluids and a transmission line of resistance R for electrical energy of predetermined frequencies lying between the ranges of $f_1$ and $f_2$ which section comprises a tubular drill pipe section, means at each end of said drill pipe section for engaging the end of another drill pipe section whereby a drill string may be formed by the use of a plurality of said pipe sections joined end to end, two annular split transformer cores, one secured to each end of said pipe section, extending around the periphery thereof and mounted substantially flush with the open ends thereof, whereby one of said cores forms a substantially closed magnetic circuit with another such core when two of said pipe sections are engaged, a primary transformer coil in one of said cores, a secondary transformer coil in the other of said cores, ground connections from a terminal of each coil to the walls of said pipe section, an insulated connector between the primary coil and the secondary coil and a condenser in said insulated connector, said coils, cores, and condenser being chosen of such values that when two of said pipe sections are engaged, the self-inductance L of each of said coils adjacent the common joint is defined by the equation $$L = R\frac{(f_1^2 + f_2^2)R}{4\pi f_1 f_2 (f_2 - f_1)}$$

the mutual impedance $L_m$ between said coils adjacent said common joint is defined by the equation $$L_m = R\frac{f_1 + f_2}{4\pi f_1 f_2}$$

and the capacity of C of said condenser is defined by the equation $$C = \frac{f_2 - f_1}{4\pi f_1 f_2 R}$$

2. A conduit section adapted to cooperate with similar sections to form both a conduit for fluids and a line for transmitting electrical energy, said section comprising a tubular drill pipe section, means at each end of said drill pipe section for engaging the end of another drill pipe section whereby a drill string may be formed by joining a plurality of said pipe sections end to end, an annular high-permeability core member fixed within said section and substantially flush with an end thereof, a channel in said core member, a coil within said channel, the exposed face of each core member of adjacent pipe sections being disposed opposite a corresponding core face of a similar annular core member carried by an adjacent pipe section, an electrical connection between one end of said coil and the pipe section, and an insulated conductor cable and an electrical condenser in series connecting the other end of said coil with a similar coil at the other end of said pipe section, the said condenser having a capacity and said coils having adjacent a common joint a self-inductance and a mutual impedance adapted to produce with the condensers and coils of other conduits a substantially resonant circuit within a selected band of frequencies.

3. In a conduit for transmitting both fluids and pulsating electrical energy, a plurality of pipe sections joined end to end, an insulated conductor extending along said conduit, and magnetic coupling means at a joint between two of said pipe sections for transmitting said electrical energy across said joint, said magnetic coupling means including a primary-transformer coil in one of said pipe sections and a secondary-transformer coil adjacent said primary-transformer coil but located in another of said pipe sections, the improvement comprising a condenser in said conductor, said condenser, coils, and insulated conductor being selected to produce a circuit which passes only a selected band of frequencies whereby extraneous noises will not be transmitted along said conductor.

4. In a conduit for transmitting both fluids and pulsating electrical energy, a plurality of pipe sections joined end to end, an insulated conductor extending along said conduit, and magnetic coupling means at a joint between two of said pipe sections for transmitting said electrical energy across said joint, said magnetic coupling means including a primary-transformer coil in one of said pipe sections and a secondary-transformer coil adjacent said primary-transformer coil but located in another of said pipe sections, the improvement comprising a condenser in said conductor, said condenser, coils, and insulated conductor being selected to produce a substantially resonant circuit at a desired frequency whereby the impedance of said circuit will be reduced to a minimum.

RAYMOND T. CLOUD.